United States Patent
Demmeler et al.

(10) Patent No.: US 7,377,423 B2
(45) Date of Patent: May 27, 2008

(54) APPARATUS AND METHOD FOR PROCESSING BANK NOTES

(75) Inventors: Erwin Demmeler, Memmingen (DE); Alfred Schmidt, Munich (DE); Frank Werner, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 486 days.

(21) Appl. No.: 10/517,517

(22) PCT Filed: Jun. 11, 2003

(86) PCT No.: PCT/EP03/06128

§ 371 (c)(1),
(2), (4) Date: Dec. 13, 2004

(87) PCT Pub. No.: WO03/107279

PCT Pub. Date: Dec. 24, 2003

(65) Prior Publication Data

US 2005/0209966 A1    Sep. 22, 2005

(30) Foreign Application Priority Data

Jun. 14, 2002   (DE) ............................... 102 26 540

(51) Int. Cl.
    *G06F 19/00*   (2006.01)

(52) U.S. Cl. ................ 235/379; 235/380; 705/45
(58) Field of Classification Search ........... 235/379, 235/380; 705/45
    See application file for complete search history.

(56) References Cited

U.S. PATENT DOCUMENTS

| | | | |
|---|---|---|---|
| 3,778,596 A | | 12/1973 | Wapner |
| 5,247,159 A | * | 9/1993 | Yuge et al. .............. 235/379 |
| 6,516,998 B2 | * | 2/2003 | Calder et al. ............ 235/381 |
| 7,140,537 B2 | * | 11/2006 | Blackson et al. ......... 235/379 |
| 2002/0003163 A1 | * | 1/2002 | Peebles et al. ........... 235/379 |
| 2002/0023954 A1 | * | 2/2002 | Calder et al. ............ 235/381 |

FOREIGN PATENT DOCUMENTS

| | | |
|---|---|---|
| DE | 100 49 435 A | 4/2002 |
| EP | 1 111 553 A | 6/2001 |

* cited by examiner

*Primary Examiner*—Seung Ho Lee
(74) *Attorney, Agent, or Firm*—Rothwell, Figg, Ernst & Manbeck P.C.

(57) ABSTRACT

The present invention relates to an apparatus and method for processing bank notes present as separate deposits. To improve the processing reliability of the individual deposits, it is provided that the beginning and/or end of each deposit is recognized, and a separate carrier is used for each deposit for transporting the deposit to processing.

12 Claims, 3 Drawing Sheets

APPARATUS AND METHOD FOR PROCESSING BANK NOTES

CROSS-REFERENCE TO RELATED APPLICATION

This application is a National Phase of International Application Serial No. PCT/EP03/06128, filed Jun. 11, 2003.

FIELD OF THE INVENTION

The present invention relates to an apparatus and method for processing bank notes present as separate deposits.

DESCRIPTION OF THE BACKGROUND ART

Apparatuses and methods for processing bank notes present as separate deposits are known. The separate deposits are prepared for upcoming processing prior to processing by a bank note processing machine. For this purpose, in particular data or information of the deposit is detected and made available to the bank note processing machine for processing. The data can comprise information on the depositor, an account number, the quantity and value of the bank notes forming the deposit, etc. To permit uninterruptible processing by the bank note processing machine, the deposits are separated from each other by separation cards inserted between different deposits. The bank note processing machine recognizes these separation cards and thus also the beginning of a new deposit during processing.

A deposit can consist of several subunits (subdeposits). A subunit can contain for example the daily receipts of a single cash till in a store branch or a single bank counter in a bank branch. Such subunits are as a rule compiled by a clearly responsible cashier and delimited from each other for example by bands. The bands are as a rule provided with information which identifies the person responsible for compilation, e.g. by a special stamp and/or signature. The band is frequently also provided with information about the depositor, that is, the name of the chain of stores or bank.

The separation of subunits with bands is frequently used in the compilation of bank notes with a predefined number of bank notes of a certain denomination, e.g. a bundle of 100 bank notes of 100 euros each, and thus a fixed total value.

A further possibility for separating subunits consists in the use of sealed bags, e.g. safebags, or sealed envelopes, which are likewise provided with information about the depositor and the person responsible for compilation.

To simplify further processing, the subunits of a chain of stores or bank are packed into a deposit in a transport container which is transferred to a money processing center with a delivery document on the value of the deposit. The money processing center checks whether the deposit contains the value stated on the delivery document and causes a corresponding credit entry in the depositor's account. If a deviation is ascertained or a forged bank note recognized in this check, however, the person responsible for compiling the subunit must be determined, so that he can possibly be held liable for the deviation or questioned as a witness for the acceptance of a forgery. This makes it necessary to keep all information about a subunit until the positive completion of the check and not to mix the associated bank notes with other bank notes until their value is clearly ascertained and brought to account. The separation and identification of the subunits can likewise be effected here with separation cards inserted between different subunits.

To improve the continuity of processing of deposits or the bank notes forming the deposits, it has also become known e.g. from DE 195 12 505 A1 to use containers, so-called carriers, in which the bank notes of the different deposits as well as the separation cards separating the deposits are inserted to be supplied to the bank note processing machine. In this case the carriers are brought by a transport device, one after the other, to the area of a singler of the bank note processing machine and taken by the singler singly out of the carrier for processing in the bank note processing machine.

However, it has turned out in the processing of bank notes by known apparatuses and methods for processing bank notes present as separate deposits that correct separation and integrity of the different deposits is no longer guaranteed using separation cards if malfunctions occur in the bank note processing machine. This results from the fact that the order of bank notes in the bank note processing machine can be changed if for example a jam of bank notes occurs during their transport through the bank note processing machine. In this case it repeatedly happens that bank notes of different deposits are mixed, i.e. a bank note belonging to the deposit after a separation card is positioned by the jam before the separation card and thus wrongly allocated to the deposit before the separation card. An exact separation of the deposits is in this case hardly possible, or can only be had with great time expenditure.

SUMMARY OF THE INVENTION

The problem of the present invention is therefore to specify an apparatus and method for processing bank notes present as separate deposits by which reliable separation of the deposits is possible even if malfunctions occur during processing, while processing of the deposits is continuous to the greatest possible extent.

This problem is solved according to the invention by the features disclosed herein.

The invention starts out from the idea of recognizing the beginning and/or end of each deposit and using a separate carrier for each deposit for transporting the deposit to processing.

The advantage of the invention is to be seen in particular in that the use of a separate carrier for each deposit obtains reliable separation of the deposits, since each deposit can be uniquely allocated to a carrier. Moreover, the change of carriers after processing of a deposit produces a brief interruption which ensures that the bank notes of different deposits are separated from each other. This separation results since the bank notes of a deposit situated in the bank note processing machine are as a rule completely processed, i.e. stacked and brought to account, by the bank note processing machine before bank notes of the next deposit pass into the bank note processing machine for processing. Should the length of time of the change of carriers be too short for reliably avoiding mixing, the change of carriers can also be effected with a delay. This avoids the mixing of bank notes from different deposits.

A development provides that the carrier receives a deposit separated into a plurality of subunits which is separated by separation cards and can be supplied continuously.

The use of separation cards between the subunits of a deposit permits a deposit to be supplied continuously, whereby separate accounting of the subunits is still possible. In case of malfunctions in the bank note processing machine, however, the unique allocation of bank notes to the subunits can be impaired and the determination of value thus faulty, as mentioned above. In most cases such allocation errors compensate each other within a deposit, so that the deposit can be given a credit entry according to the delivery document and the deviations that occurred are not pursued. In case of an uncompensable deviation in a subunit, however, it is in each case ensured that the value of the deposit is determined correctly and a credit entered according to the actually delivered value. With high probability the faulty subunit can also be determined correctly, since it is possibly errored only in case of a comparatively rare machine malfunction. The advantage of this invention therefore results from the efficient continuous processing of a deposit subject to a very high security level in combination with the check of the subunits contained therein at a somewhat lower security level.

BRIEF DESCRIPTION OF THE DRAWINGS

Further advantages of the present invention will result from the dependent claims as well as the following description of embodiments with reference to figures, in which:

DETAILED DESCRIPTION OF THE INVENTION

Figure 1:
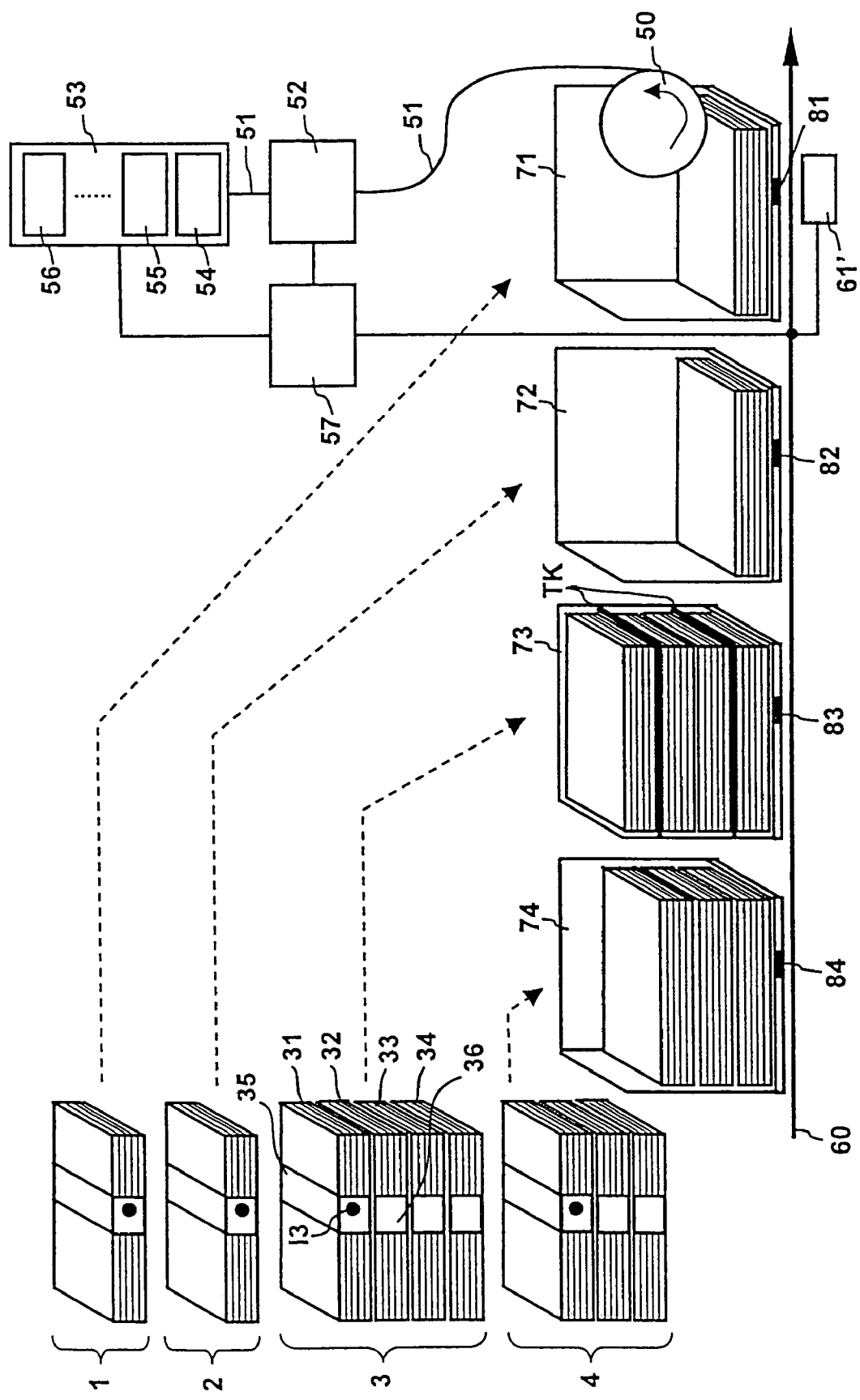
FIG. 1 shows a general view of a schematic structure of an apparatus for processing bank notes present as separate deposits.

FIG. 1 shows a general view of a schematic structure of an apparatus for processing bank notes present as separate deposits.

The apparatus for processing bank notes consists substantially of a bank note processing machine 50 to 57. The bank note processing machine has a singler 50, a transport system 51, a checking device 52, a delivery device 53 and a control device 57. Bank notes to be processed are grasped by the singler 50 and transferred singly, one after the other, to the transport system 51. The transport system 51 transports the single bank notes through the checking device 52, which can consist of a plurality of sensors for checking different properties of the bank notes. The data provided by the checking device 52 are evaluated by the control device 57 and used for controlling the delivery of bank notes in the delivery device 53, which can have a plurality of pockets 54 to 56. The described bank note processing machine 50 to 57 can be used for example for checking the bank notes for authenticity and denomination and providing the determined values for accounting. This makes it possible for example to determine for each deposit how many bank notes it contains and what total value it has. Further, the bank notes of different denominations can be transported under the control of the control device 57 by the transport system 51 into different pockets 54 to 56 of the delivery device 53, so they can be sorted according to their denomination.

FIG. 1 further shows the processing of four separate deposits 1 to 4.

The deposits 1 to 4 each consist of one or more bundles of bank notes which are formed by means of bands. For recognition of the boundaries between deposits, the first bundle of a deposit is marked. The marking can likewise be provided at the end of the deposit, i.e. on the last bundle of a deposit, or on the first and last bundles of a deposit. Such marking can be done for example by a printed or glued bar code or by a special color marking with a specified color and/or position of the marking.

The bands are removed from the bundles of the individual deposits 1 to 4, and the loose bank notes of the individual bundles of the deposits 1 to 4 are inserted into carriers 71 to 74. Only the bank notes of a single deposit 1 to 4 are inserted into each carrier 71 to 74. As shown in FIG. 1, the carrier 71 contains only the bank notes of the first deposit 1, the carrier 72 only the bank notes of the second deposit 2, the carrier 73 only the bank notes of the third deposit 3, etc. For unique identification of the carriers 71 to 74, the carriers 71 to 74 can have unique markings 81 to 84.

During processing of the deposits 1 to 4 by the bank note processing machine 50 to 57, the bank notes of the first deposit 1 are first grasped from the carrier 71 by the singler 50 and the first deposit 1 brought to account by the control device 57. To permit allocation to the first deposit 1, a sensor 61' is present which detects the unique marking 81 of the carrier 71 and provides it to the control device 57. After all bank notes of the first deposit 1 have been singled or processed, the next carrier 72 containing the second deposit 2 is brought by a transport device 60, under the control of the control device 57, to the area of the singler 50 so that the second deposit 2 can be processed by the bank note processing machine 50 to 57. Further deposits or carriers are processed accordingly.

Figure 2:
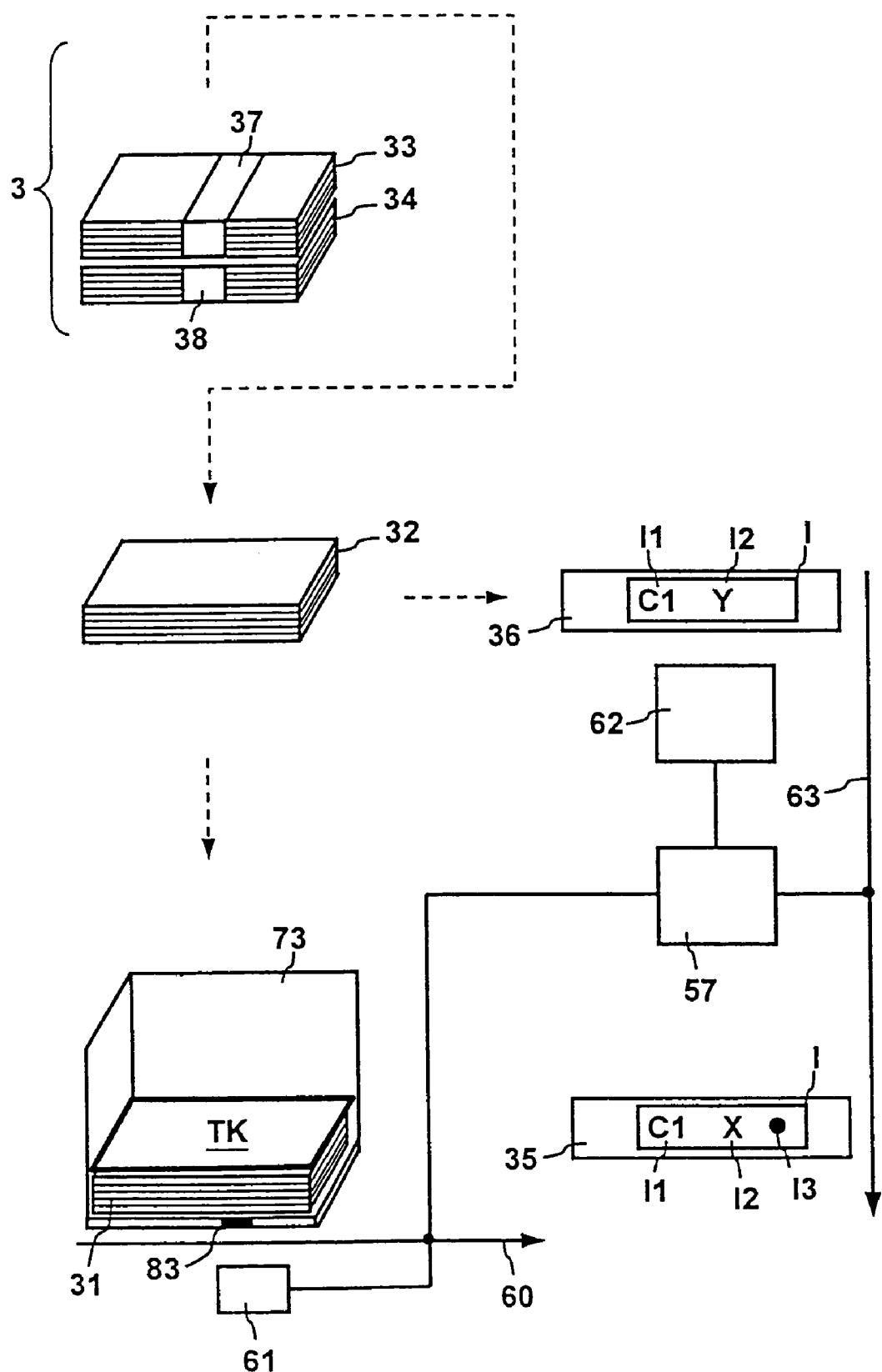
FIG. 2 shows a detail of the apparatus according to FIG. 1 during preparation of a deposit for processing.

FIG. 2 shows a detail of the apparatus according to FIG. 1, by way of example during preparation of the third deposit for processing.

The third deposit 3 consists of four bundles 31 to 34 which are formed by means of bands 35 to 38. The bands 35 to 38 have data or information I identifying the deposit 3 or the individual bundles 31 to 34. The information I consists of first information I1 which relates for example to the depositor and/or has a unique identification, for example a consecutive number for each bundle, which can be allocated to the depositor. Further, second information I2 is present which allows a further subdivision within a deposit. Bundles within a deposit with the same second information I2 are regarded for example as belonging together. Third information I3 of the band 35 of the first bundle 31 serves the above-described purpose of marking the beginning of the third deposit 3. The third information I3 can consist for example of a dot which can be glued on the band of the first bundle of a deposit after the deposit has been completely formed. In another instance, the third information I3 can consist of a bar code which has for example been applied by the money processing center upon acceptance of the delivery and opening of the transport container. The information I is detected by a sensor 62 and provided to the control device 57.

At the time shown, the first bundle 31 is already prepared and the bank notes of the first bundle 31 are stored in the carrier 73. Since the first band 35 of the first bundle 31 of the third deposit 3 contains the third information I3 identifying the beginning of a new deposit, the transport device 60 has brought the empty carrier 73, under the control of the control device 57, into a filling position. Allocation of the carrier 73 to the third deposit is effected by detection of the unique marking 83 of the carrier 73 by a sensor 61 which provides the data of the detected marking 83 to the control device 57. The latter joins the marking 83 of the carrier 73 with the information I of the bands 35 to 38 of the third deposit 3.

At the time shown according to FIG. 2, the band 36 of the second bundle 32 has just been removed from the second bundle 32, e.g. by being slipped off or cut off the bundle. The information I of the band 36 of the second bundle 32 is detected by the sensor 62 and provided to the control device 57. This information I is allocated to the carrier 73 or the marking 83 thereof, as described above. Since the second information 12 (Y) for the second bundle 32 deviates from the second information 12 (X) of the first bundle 31, a subunit within the third deposit 3 is involved here, as described above. For example, the deposit 3 can consist of the daily receipts of different cash registers which are to be brought to account separately. For this reason a separation card TK was placed on the bank notes of the first bundle 31 that were stored in the carrier 73 to separate the bank notes of the first bundle 31 from the bank notes of the second bundle 32 and permit separate accounting in the bank note processing machine 50 to 57. The separation card TK can likewise have unique features, e.g. an identification number, which are evaluated in the bank note processing machine 50 to 57 during later processing. Supplying of the separation card TK is effected with a dispensing apparatus not shown here, which removes a separation card TK from a stack of prefabricated separation cards and reports the associated identification number to the control device 57. This allows a direct join of the information on the band detected by the sensor 62 with the separation card TK.

The bands 35 and 36 of the first and second bundles 31 and 32 are kept in a storage device 63, whose function will be explained hereinafter, during processing of the deposit 3 by the bank note processing machine 50 to 57.

After detection of the information I of the band 36 of the second bundle 32, the bank notes of the second bundle 32 are delivered to the carrier 73 onto the separation card TK. Then the remaining bundles 33 and 34 of the third deposit 3 are handled in the above-described way. As soon as the beginning of the fourth deposit 4 is detected by the sensor 62 through third information 13 provided on the band, the carrier 73 is taken away by the transport device 60, under the control of the control device 57, and the next carrier 74 is transported by the transport device 60 to the filling position.

Figure 3:
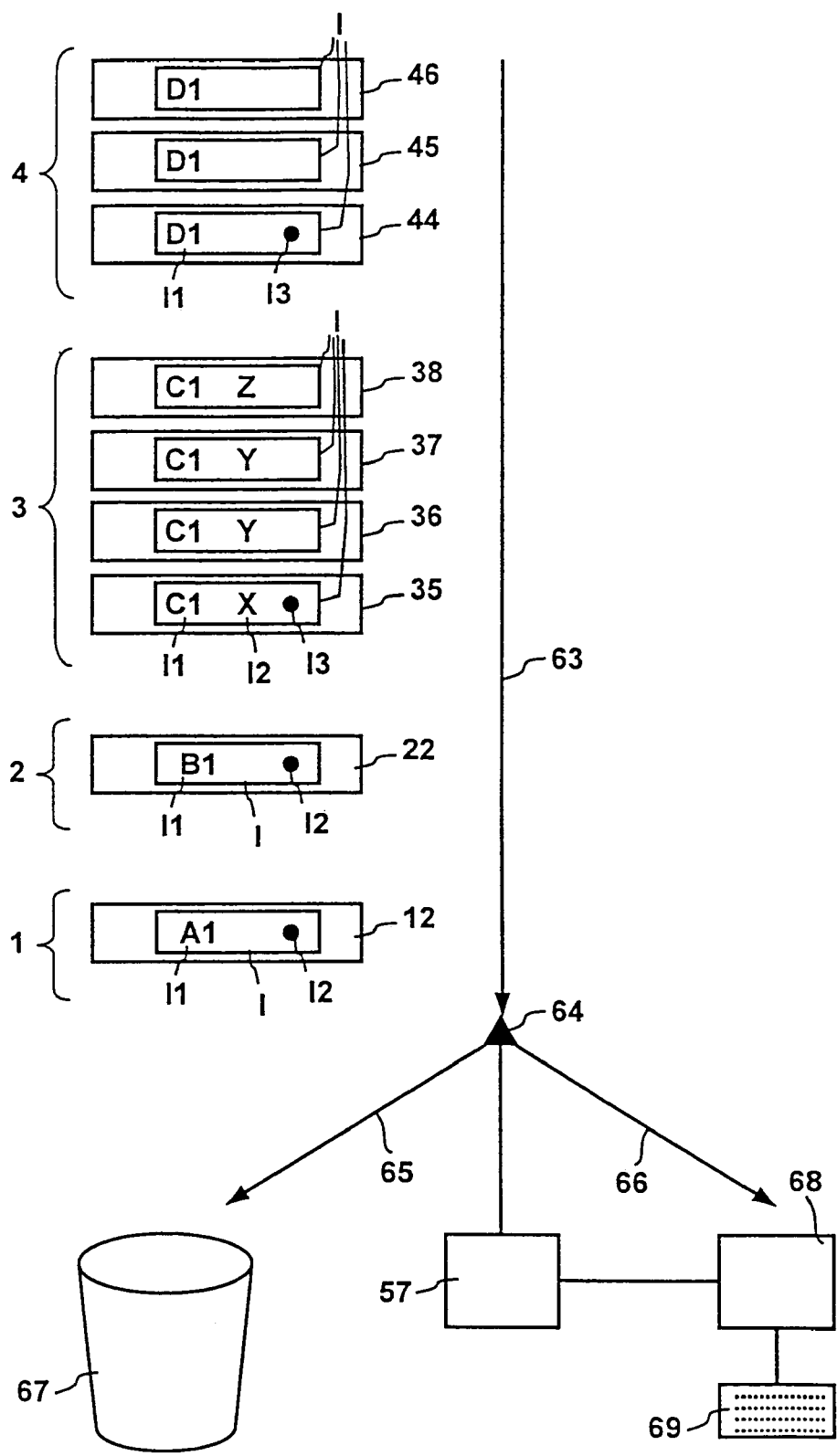
FIG. 3 shows the handling of bands contained in the deposits for a check upon the occurrence of discrepancies in the processing of the deposits.

FIG. 3 shows the handling of bands 12 to 46 contained in the deposits 1 to 4 for a check upon the occurrence of discrepancies during processing of the deposits 1 to 4.

The handling of the bands 12 to 46 is served by the above-mentioned storage device 63 in which the bands 12 to 46 are kept after the information I has been detected by the sensor 62. If no discrepancies are ascertained during processing of the bank notes of the deposits 1 to 4 by the bank note processing machine 50 to 57, the bands 12 to 46 are disposed of. This means that the information provided e.g. by the depositor matches the values determined by the bank note processing machine 50 to 57, in particular with regard to the total value of the deposit.

The storage device 63 is organized as a so-called FIFO storage, i.e. the bands 12, 22, . . . inputted to the storage device 63 first are outputted from the storage device 63 first, in this order. For this purpose the bands are removed from the storage device 63 via a diverter 64 which is controlled by the control device 57. If the determined total value matches the depositor's statement for a deposit, the bands of the deposit or subunits are supplied via the diverter 64 and a transport path 65 to a disposal unit 67. If deviations occur, all bands of the deposit or subunit, or those recognized as at variance by the control device 57, are provided for a check via the transport path 66. For the check an output/input device 68, 69 can for example be provided, e.g. a PC connected to the control device 57. Said output/input device 68, 69 permits for example an operator to input information on the band which the sensor 62 was unable to detect, as well as the printout of a deviation log for the depositor, to which the band of the faulty bundle can be fastened or connected in another way (e.g. insert bag).

The storage device 63 can be executed as a simple stacking delivery, as a continuous conveyor belt with pockets, or as a winding station. An identification of the individual pockets, e.g. in the form of coded pocket numbers or the detection of the transport path, permits the control device 57 to trace the accepted bands and allocate them uniquely upon the output via the diverter 64.

In a further application of the output/input device 68, 69, the control device 57 can display all relevant information of a deposit. The operator can thus check the deviations of the subunits of a deposit and if necessary compensate them by transfers if there are plausible indications that the deviations were caused by a machine malfunction. In this case the bands are supplied to the disposal unit 67. If an uncompensable deviation is ascertained for subunits, the associated bands are kept for later investigations and can optionally be attached to the deviation log.

In the examples shown in FIGS. 1 to 3, the order of bands stored in the storage device 63 does not match the order in which the bank notes of the bundles are supplied by the singler 50 to the bank note processing machine 50 to 57. This results because the bundles are fed into the carriers in the given order of the deposit (e.g. carrier 73 or deposit 3, order of bundles: 31, 32, 33, 34), but the singler 50 of the bank note processing machine 50 to 57 (FIG. 1) grasps the bank notes of the uppermost bundles in the carriers first (e.g. carrier 73 or deposit 3, order of grasped bundles: 34, 33, 32, 31). This results in a reverse order within each deposit for the bands kept in the storage device 63 (e.g. deposit 3, order of bands: 35, 36, 37, 38 instead of 38, 37, 36, 35). However, this problem can be readily solved by using e.g. a singler that grasps the lowermost bank notes first. It is likewise possible to collect the bank notes of a deposit or the bands thereof and reverse the order before insertion into the carrier or the storage device 63. A further possibility is to have the reversal of order corrected by the control device 57 by the changed order within the deposits being taken into account upon the output of the bands from the storage device 63.

In a special embodiment, the sensor 62 can have a scanning apparatus which scans as an image all information contained on the band and transmits it to the control device 57 for storage. Such a scanning apparatus can consist for example of a digital camera which images the front and/or back of the bundle, in particular the band area. If this image is sufficient for complete and unique identification of the band or the person responsible for preparing the subunit, a further physical allocation of the band and thus a storage device 63 can be dispensed with. In this case the information read by the sensor 62 can be printed on the deviation log. The EDP treatment of the information on the band makes it possible for the deviation logs to be managed, printed and/or forwarded to the deliverer by electronic channels, e.g. by e-mail, by a central office.

Besides the described embodiments for an apparatus and method for processing bank notes present as separate deposits, there are a multitude of possible variations.

For example, the markings 81 to 84 of the carriers 71 to 74, the separation cards TK as well as the bands 35 to 37 can be coded uniquely, e.g. by means of bar codes, alphanumeric characters, etc., but they can also have electrical or electronic circuits that are readable and/or writable in contactless or contacting fashion, such as transponders. For these cases the sensor 62 for detecting and/or writing the data I of the deposits, the sensors 61, 61' for detecting and/or writing the unique marking 81 to 84 of the carriers 71 to 74, and the checking device 52 for detecting and/or writing the separation cards TK must be designed accordingly. If data can be written, it is possible to also store the information of the deposits in the unique markings 81 to 84 and the separation cards TK. The stored information is then read during processing of the bank notes in the bank note processing machine 50 to 57 (sensor 61', checking device 52) and is taken into account during evaluation by the control device 57. In this case a connection of the control device 57 with the sensors 61 and 62 can be omitted.

Should individual deposits be very extensive, two or more carriers can also be used for these very extensive deposits, whereby the unique markings of the carriers used are allocated to the deposit accordingly. In this case a continuous supply of bank notes with an uninterruptible change of carriers is expedient, so that the efficiency of the bank note processing machine 50 to 57 can be maximally exploited.

Further, it is possible that deposits or subunits are present completely or partly unbundled, i.e. none or only some of the subunits of a deposit have bands. The beginning and/or end of a deposit can then be identified by suitable other means, e.g. specially marked separation cards or by separation of the deposits by means of containers each containing only one deposit.

The beginning and/or the end of a deposit can also be derived from the first information I1 contained on the band, which relates for example to the depositor. If the depositor is the same in consecutive bundles, the latter are treated as one deposit with associated subunits. If the depositor changes, the control device automatically recognizes the beginning of a new deposit without third information I3 being necessary.

In a further instance of the use of the information I1, the control device 57 can be programmed so that the processing of the deposits is done by different methods. A first depositor can for example arrange with the money processing center that all subunits are processed on the same security level as deposits and therefore only one subunit per carrier is allowed. A second depositor can arrange that the subunits are not processed and brought to account separately at all and therefore no separation card between the subunits is used. Therefore the money processing center can adapt the security level and thus the processing costs in accordance with the depositor's wishes.

The subunits contained in a transport container can be packed in bags and/or envelopes. Said bags and/or envelopes can be read and processed in analogous fashion to the bands.

All processing steps described and shown in the Figures, such as the removal of the bands at the filling position, can be performed manually or automatically by corresponding mechanical means.

Furthermore, the functions described for the control device 57 can be performed by a plurality of control devices that cooperate. For example, a control device for the bank note processing machine can be provided that cooperates with a control device for the sensors 61, 61' and 62, the transport device 60 as well as the storage device 63 to 66.

The invention claimed is:

1. A method for processing bank notes present as separate deposits, comprising:
   detecting information associated with each deposit, including at least one of the beginning or end of each deposit,
   feeding the bank notes of each deposit into a separate carrier, each carrier having a unique marking,
   detecting the unique marking of each carrier,
   joining the information associated with each deposit with the detected marking of each respective carrier,
   transporting each carrier to a bank note processing machine, and
   detecting the unique marking of each carrier for processing of the respective deposit by the bank note processing machine.

2. A method according to claim 1, characterized in that a deposit is subdivided into subunits by feeding at least one separation card, the separation card being recognized during processing of the bank notes so that the subunits of a deposit can be brought to account.

3. A method according to claim 2, characterized in that deviations occurring in subunits of a deposit are balanced against each other.

4. A method according to claim 1, characterized in that the deposits are formed by one or more bundles of bank notes each having a band, the bands being removed from the bundles before the bank notes of the bundles are fed into the particular carrier.

5. A method according to claim 4, characterized in that the bands are stored in the order in which they appear in at least one of the deposits or subunits, the bands are removed from storage after successful processing of the associated bank notes, and the bands are provided for at least one of a check or investigation after ascertainment of deviations in at least one of the deposits or subunits.

6. A method according to claim 4, characterized in that an image of each band is recorded and stored.

7. A method according to claim 1, characterized in that the deposits of a certain depositor are treated according to specifications coming from the depositor, the specifications being derived from the information.

8. An apparatus for processing bank notes present as separate deposits, comprising:
   a bank note processing machine having a singler, a transport system, a checking device, a delivery device and a control device,
   a transport device for transporting carriers containing the deposits to the singler, each carrier having a unique marking,
   a first sensor and a second sensor for detecting the unique marking of each carrier,
   a third sensor for detecting information associated with each deposit, including at least one of the beginning or end of each deposit, and
   a filling position at which the bank notes of each deposit are fed into a separate carrier, each carrier transporting the bank notes of one deposit to the singler for processing,
   wherein the information associated with each deposit, detected by the third sensor, is joined with the unique marking of each respective carrier detected by the first sensor, and
   wherein the unique marking of each carrier, detected by the second sensor, is used for processing of the respective deposit by the bank note processing machine.

9. An apparatus according to claim 8, characterized in that separation cards are to be fed at the filling position for subdividing the deposits, the separation cards being recognized by the checking device so that an accounting for the bank notes of the deposits can be subdivided.

10. An apparatus according to claim 8, characterized in that the deposits are formed by one or more bundles of bank notes each having a band, the bands being removed from the bundles at the filling position before the bank notes of the bundles are fed into the particular carrier.

11. An apparatus according to claim 10, characterized in that a storage device stores the bands in the order in which they appear in at least one of the deposits or subunits, the storage device removes the bands after successful processing of the associated bank notes for disposal, and the storage device provides bands after faulty processing of at least one of the deposits or subunits for at least one of a check or investigation.

12. An apparatus according to claim 10, characterized in that the third sensor produces an image of each band, said image being stored in the control device.

\* \* \* \* \*